Sept. 13, 1955 W. F. ROBB 2,717,727
DISPENSER BOTTLE
Filed March 9, 1953
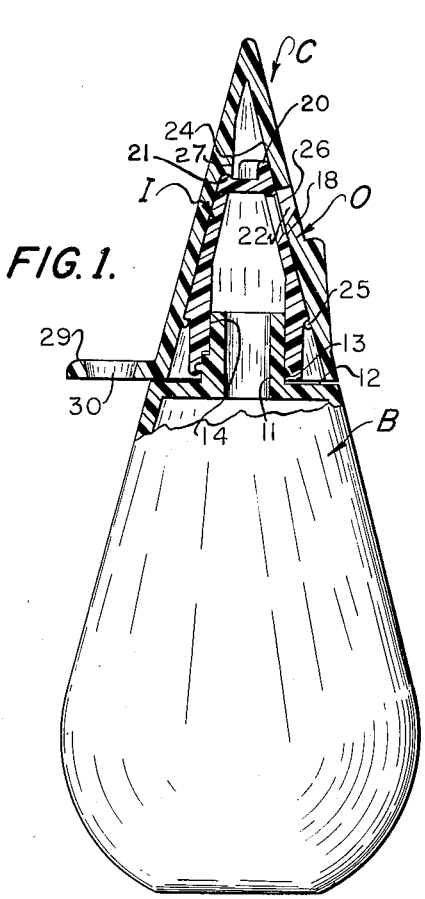
FIG. 1.
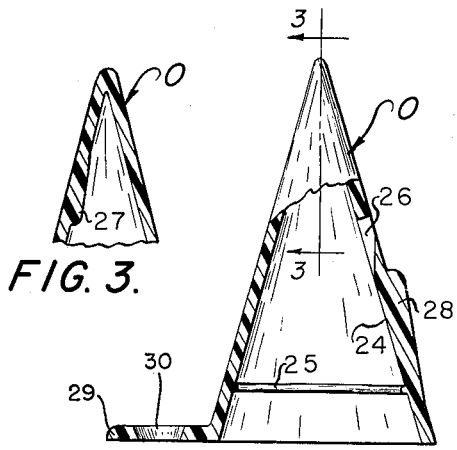
FIG. 3.
FIG. 2.
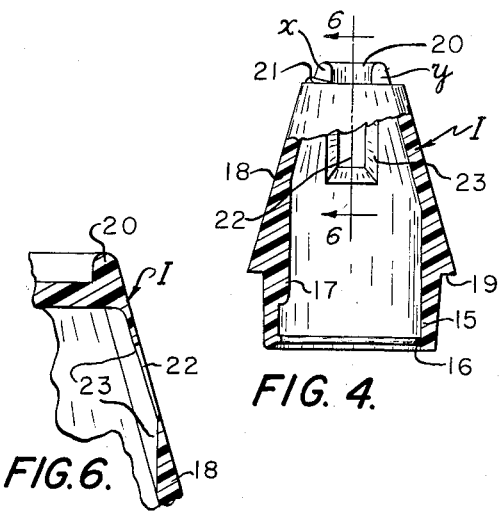
FIG. 6.
FIG. 4.
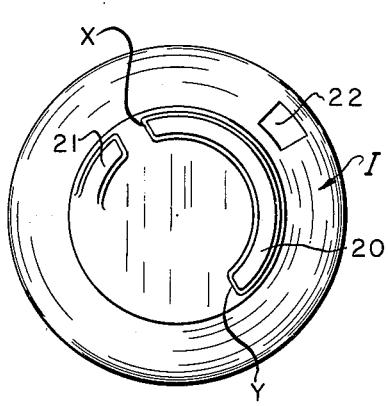
FIG. 5.
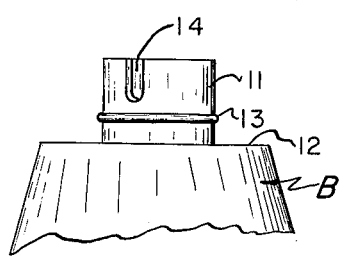
FIG. 7.
INVENTOR.
Wayne F. Robb
BY
P. V. Lamphere
ATTORNEY

United States Patent Office 2,717,727
Patented Sept. 13, 1955

2,717,727
DISPENSER BOTTLE

Wayne F. Robb, Aurora, Colo., assignor, by mesne assignments, to Dry-O-Scent Company, Denver, Colo., a corporation of Colorado Application March 9, 1953, Serial No. 341,091

14 Claims. (Cl. 222—512)

This invention relates to dispensing, and more particularly to the dispensing of liquid from a receptacle or bottle and particularly a receptacle which is made from pliable material.

One of the objects of the invention is to produce an improved container for liquids and means for the dispensing of the liquid therefrom.

Another object is to produce a dispensing cap structure for a liquid container or bottle which will permit dispensing when a cap structure is turned to one position or complete sealing of the container when the cap structure is turned to another position.

Still another and more particular object is to produce a bottle of pliable material permitting the liquid to be dispensed by a squeezing action on the bottle and an improved cap control structure through which the liquid can be dispensed as desired.

A further object is to produce an improved rotatable cap structure for a liquid container or bottle made from pliable material whereby the liquid will be dispensed therefrom by a squeezing action, said cap structure permitting dispensing or sealing of the liquid as desired.

A still further object is to produce a control cap structure for a liquid container which can be easily constructed and readily attached and detached from the container.

Yet a further object is to produce a cap structure for controlling dispensing of liquid from a container or bottle which will embody two nested members having relative rotation for opening and closing a dispensing orifice and being so constructed that when the orifice is closed and pressure is developed on the liquid, there will be increased sealing action at the orifice.

Yet another object is to produce a dispensing cap of the kind above referred to which will be provided with means for assuring "locked" closed condition of the orifice during shipping and prior to use, yet such will not interfere with normal opening and closing of the orifice during regular use when the orifice is desired to be opened and closed as required.

A still further object is to produce an improved container or bottle for liquid which can be made of a pliable plastic material to permit dispensing of the liquid by squeezing the container or bottle and whereby dispensing will be controlled by an improved cap structure easily and quickly attached and detached and embodying nested conical structures having relative rotation.

Other objects will become apparent from the following description taken in connection with the accompanying drawing wherein:

Figure 1 is a side view of a liquid container embodying my invention, said container having its cap shown in section;

Figure 2 is a partial longitudinal sectional view of the outer rotatable conical member of the dispensing cap;

Figure 3 is a longitudinal sectional view of the extreme top of the cap shown in Figure 2, said view being taken on the line 3—3 of Figure 2;

Figure 4 is a longitudinal sectional view of the inner conical member of the cap;

Figure 5 is a top view of said inner conical member;

Figure 6 is a sectional view taken on the line 6—6 of Figure 4; and

Figure 7 is a side view of the top of the container with the dispensing cap removed.

Referring now to the drawings in detail, the dispensing receptacle or bottle shown as embodying my invention comprises a hollow container body B which is to be made from a pliable material, preferably one that can be moulded. A preferred substance is a plastic material known as polyethylene, although it can be made from other pliable material if desired, such as rubber, a synthetic rubber or other plastics. The type of material used may vary in accordance with the fluid to be contained thereby and, therefore, my improved container is not to be considered as limited to any particular material for its construction outside of the requirement that it be pliable so the bottle can be "squeezed" to facilitate dispensing. The body 10 to contain the fluid may be of any shape desired. As shown, it has a shape similar to that of a frustum of a cone and when its conical cap C is associated therewith it is of a general tear drop shape simulating a cone with a large rounded end which has a flat bottom wall so the bottle can be set on any flat surface.

The body B at its top end has an upwardly extending cylindrical neck 11 which is of less diameter than the upper end of the body, thus establishing a surrounding shoulder wall 12. This neck 11 is provided with a circular ridge 13 on its outer surface above the shoulder whereby the cap C can be "locked" thereon. Above the ridge on the outer surface of the neck is an axially extending groove 14 closed at its lower end and open at the top of the neck which is employed for keeping the inner cap member from turning on the neck, as will become apparent.

The cap C, which is shown as generally conical in order to carry out the tear drop shape, is constructed to have an outer cap member O and an inner cap member I. These members each have like inner and outer conical surfaces so that the inner member nests in the outer member, as can be readily observed from Figure 1.

The inner member I is shown in detail in Figures 4, 5 and 6 and is somewhat in the shape of a hollow frustum of a cone. The lower part has a cylindrical section 15, the inner diameter of which is such as to slip over the neck 11 of the body B. On the inner surface of this section is a ridge 16 close to the lower end. Thus, when the cap is placed on the body, this ridge on the inner cap can snap over this ridge 13 on the neck and hold the cap C on the body of the bottle. The inner cap member I is to be held from rotation with respect to the body and this is accomplished by providing the inner cylindrical surface of the inner cap member with a longitudinally extending rib 17 which will be received in the groove 14 on the neck when the cap is on the body, all as shown in Figure 1.

The inner cap member above the cylindrical section 15 has a conical exterior surface 18 which at its lower end is of greater diameter than the cylindrical section to thus establish a shoulder 19, the purpose of which is to hold the outer cap member on the inner cap member. The top of the inner cap member is closed and on the exterior of the top wall is a semi-circular ridge 20 of uniform height. Spaced from one end of this ridge is a small sloping lug 21. The high part of this lug is adjacent one end of the ridge, indicated at X, and from there it slopes downwardly to the level of the top wall of the inner cap member. The ridge and lug are all shown in detail in Figures 4, 5 and 6.

The inner cap I has an opening or orifice 22 through its wall and this opening is wholly within the conical outer surface 18. The edge of this opening at the conical surface of the wall of the inner cap member is very thin or "feathered" and this is accomplished by beveling the inside of the wall around the opening as indicated at 23. With this feather edge, the wall around the opening is extremely flexible, the purpose for which will become apparent.

The outer cap member O is not only conical on its outer surface, but has an inner conical surface 24 to snugly receive or nest in the outer conical surface 18 of the inner conical member I. Near the lower end of the inner conical surface 24 is a circular rib 25 which, when the cap members are nested together, will snap behind the shoulder 19 on the inner cap member, thus locking the two cap members together, yet permitting the outer cap member to be rotated on the inner cap member, all as shown in Figure 1.

The outer cap member has an opening or orifice 26 through its wall which is so positioned as to be aligned with the opening 22 in the inner cap member upon proper turning of the former. When the openings are aligned, liquid can be dispensed from the bottle. If the outer opening is fully removed from any connection with the inner opening, then the bottle will be closed against dispensing of liquid therefrom. Furthermore, with the feather edge at the opening 22 of the inner cap member, this edge will be pressed tightly against the inner conical wall 24 of the outer conical member, because of its extreme pliability, by any pressure exerted from inside the bottle. The result will be a very good sealing action which increases with increased pressure.

On the inside of the outer cap member above the top of the inner cap member, when the two are in nested relation, is a locking and control lug 27, best shown in Figures 1 and 2. This lug cooperates with the ridge 20 and lug 21 on the top wall of the inner cap member to control the extent of relative rotation between the member and also yieldably "lock" the members in closed condition against easy relative rotation when desired, as, for example, when shipping. The lug 27 is so placed that it will engage the end X and the other end Y of the ridge 20 on the inner cap member. Thus, the outer cap member can only be rotated to such an extent as permitted by the distance between the ends of the ridge 20. It will be noted the highest part of lug 21 on the top of the inner cap member is somewhat lower than the top of ridge 20. This height is such as to permit the lug 27 on the outer cap member to ride over the lug 21 and become positioned between the lug 21 and the adjacent end X of the ridge 20. This is permitted by some yielding of the material from which the bottle is made, all without any possibility of the inner cap being disconnected from the neck of the bottle at the locking ridges 16 and 25. When the lug 27 is over the lug 21 and between the latter and the end X of ridge 20, the bottle will be fully closed and yieldably locked in such position. The openings 22 and 26 will be fully out of any overlapping position. This locked condition thus permits the bottle to be hung on a hook or nail when desired.

From the foregoing description of a bottle embodying my invention, it is seen that I have produced a bottle of pliable material from which liquid may be readily dispensed, as desired, by a squeezing action on the body of the bottle, but only when the dispensing orifices are aligned. If the two caps are so positioned that the two holes therein have no overlapping relation, then dispensing is prevented. A good seal is established by the feather edge on the inner cap member hole since it results in increasing sealing action as squeezing action increases. There is also provided in the bottle cap a "yieldable" locked closed position of the two cap members which is convenient for shipping the bottle or when taking it on a trip. The inner and outer members of the cap are designed to be held firmly together for relative rotation and the inner cap member and neck of the bottle are designed so the whole cap can be readily attached and detached, yet the inner cap will always be held from any rotation on the bottle body. The yieldability of the material will assure that the ridge 16 on the inner cap will be firmly locked below the ridge 13 on the bottle neck, yet with a relatively strong pulling force, the cap can be removed.

I have illustrated a particular dispensing bottle as embodying my invention and have referred to certain pliable material from which it can be made, but it is believed to be obvious that modifications can be made and other material used, all without departing from the fundamental principles of my invention. Therefore, I desire it to be understood that the scope of my invention is not to be limited except in accordance with the terms of the appended claims.

What is claimed is:

1. In a dispensing structure, a chambered body for containing a substance to be dispensed and provided with a neck portion, and a dispensing cap for the neck comprising a hollow inner cap member and a hollow outer cap member mounted for relative rotation in nested relation with substantial surfaces of the walls around their common axis in juxtaposed relation, means for connecting the members together for relative rotation but preventing relative axial movement, means for non-rotatively attaching the inner cap member to the neck, said inner and outer cap members having permanently existing openings for alignment relation or full out of alignment relation by a turning of the members relatively, said inner cap member being made of flexible material and having its wall which surrounds the opening free of any overlapping relation and beveled to form a thin easily flexed edge capable of being readily forced into tight engagement with the inner wall of the outer cap member.

2. In a dispensing structure, a chambered body for containing a substance to be dispensed and provided with a neck portion, a dispensing cap for the neck comprising a hollow inner cap member and a hollow outer cap member mounted for relative rotation in nested relation with substantial surfaces of the walls around their common axis in juxtaposed relation, means for connecting the members to prevent separation but permitting relative rotation, means for non-rotatively attaching the inner cap member to the neck, said inner and outer cap members having permanently existing openings for alignment relation or full out of alignment relation by a turning of the outer member on the inner member, and cooperating projecting means carried on the exterior of the inner cap member and the interior of the outer cap member at points spaced from the openings for limiting the extent of relative rotation between said members to thereby readily locate "closed" and "open" condition of the dispensing structure.

3. In a dispensing structure, a chambered body for containing a substance to be dispensed and provided with a neck portion, a dispensing cap for the neck comprising a hollow inner cap member and a hollow outer cap member mounted for relative rotation in nested relation with substantial surfaces of the walls around their common axis in juxtaposed relation, means for connecting the members together for relative rotation but preventing relative axial movement, means for non-rotatively attaching the inner cap member to the neck, said inner and outer cap members having permanently existing openings for alignment relation or full out of alignment relation by a turning of the outer member relatively, said inner cap member being made of flexible material and having its wall which surrounds the opening free of any overlapping relation and beveled to form a thin easily flexed edge capable of being readily forced into tight engagement with the inner wall of the outer cap member, and cooperating means carried by the inner cap member and the outer cap member for yieldably holding the said members in such relative positions that the openings will be fully out of any alignment.

4. In a dispensing structure, a chambered body for containing a substance to be dispensed and provided with a neck portion, a dispensing cap for the neck comprising a hollow inner cap member and a hollow outer cap member mounted for relative rotation in nested relation with substantial surfaces of the walls around their common axis in juxtaposed relation, said inner and outer cap members having top walls in spaced relation, means for connecting the members to prevent separation but permitting relative rotation, means for non-rotatively attaching the inner cap member to the neck, said inner and outer cap members having permanently existing side openings for alignment relation or full out of alignment relation by a turning of the outer member on the inner member, and cooperating projecting means carried by the exterior part of the top wall of the inner cap member and the inner part of the top wall of the outer cap member for yieldingly holding the member in a position where there is no alignment of any type of the holes therethrough.

5. In a dispensing structure, a chambered body for containing a substance to be dispensed and provided with a neck portion, a dispensing cap for the neck comprising a hollow inner cap member and a hollow outer cap member mounted for relative rotation in nested relation with substantial surfaces of the walls around their common axis in juxtaposed relation, means for attaching the members together for relative rotation, means for non-rotatively attaching the inner cap member to the neck, said inner and outer cap members having openings for alignment relation or full out of alignment relation by a turning of the outer member on the inner member, said inner cap member being of a height less than the outer cap member so as to provide a space between the tops thereof, means providing a lug carried by the top of the inner cap member and a part carried by the inner side wall of the outer cap member for engagement therewith to determine the full out of alignment of the openings.

6. In a dispensing structure, a chambered body for containing a substance to be dispensed and being provided with an upstanding cylindrical neck portion having an annular outer ridge and an axial open ended slot, a dispensing cap for the neck comprising a hollow frusto-conical inner cap member and a hollow conical outer cap member both made of a pliable material, said members having companion outer and inner conical surfaces for close nesting relation, interlocking means carried by the inner and outer cap members below the nesting companion surfaces for preventing axial separation of the members but allowing relative rotation, cooperating means carried by the top of the frusto-conical inner cap member and by the inner wall of the outer conical cap member for limiting relative rotation therebetween, said inner cap member and the outer cap member having openings in the parts of their walls which have the companion nested surfaces, said openings being placed in alignment or fully out of any alignment by relative rotation of the cap members, and means for holding the inner cap member on the neck of the body and preventing rotation relative thereto.

7. In a dispensing structure, a chambered body for containing a substance to be dispensed and being provided with an upstanding cylindrical neck portion having an annular outer ridge and an axial open ended slot, a dispensing cap for the neck comprising a hollow inner cap member and a hollow outer cap member both made of a pliable material, said members having companion outer and inner conical surfaces for close nesting relation, interlocking means carried by the inner and outer cap members below the nesting companion surfaces for preventing axial separation of the members but allowing relative rotation, said inner cap member and the outer cap member having openings in the parts of their walls which have the companion nested surfaces, said openings being placed in alignment or fully out of any alignment by relative rotation of the cap members, the wall around the opening in the inner cap member being tapered to provide a "feather" edge and establish ready flexibility, and means for holding the inner cap member on the neck of the body and preventing rotation relative thereto.

8. In a dispensing structure, a chambered body for containing a substance to be dispensed and being provided with an upstanding cylindrical neck portion having an annular outer ridge and an axial open ended slot, a dispensing cap for the neck comprising a hollow frusto-conical inner cap member and a hollow conical outer cap member both made of a pliable material, said members having companion outer and inner conical surfaces for close nesting relation, interlocking means carried by the inner and outer cap members below the nesting companion surfaces for preventing axial separation of the members but allowing relative rotation, cooperating means carried by the top of the frusto-conical inner cap member and by the inner wall of the outer conical cap member for limiting relative rotation therebetween, said inner cap member and the outer cap member having openings in the parts of their walls which have the companion nested surfaces, said openings being placed in alignment or fully out of any alignment by relative rotation of the cap members, the wall around the opening in the inner cap member being tapered to provide a "feather" edge and establish ready flexibility, and means for holding the inner cap member on the neck of the body and preventing rotation relative thereto.

9. In a dispensing structure, a chambered body for containing a substance to be dispensed and being provided with an upstanding cylindrical neck portion having an annular outer ridge and an axial open ended slot, a dispensing cap for the neck comprising a hollow frusto-conical inner cap member and a hollow conical outer cap member both made of a pliable material, said members having companion outer and inner conical surfaces for close nesting relation, interlocking means carried by the inner and outer cap members below the nesting companion surfaces for preventing axial separation of the members but allowing relative rotation, cooperating means including a part carried by the top of the frusto-conical inner cap member and a part carried by the inner wall of the outer conical cap member for providing a stop means for relative rotation therebetween, the top of said inner cap member also having means over which the part on the outer cap member can be forced to a position therebehind where the cap members will be "locked" in the closed condition of the openings, said inner cap member and the outer cap member having openings in the parts of their walls which have the companion nested surfaces, said openings being placed in alignment or closed condition where they are fully out of any alignment by relative rotation of the cap members, and means for holding the inner cap member on the neck of the body and preventing rotation relative thereto.

10. In a dispensing structure, a chambered body for containing a substance to be dispensed and being provided with an upstanding cylindrical neck portion having an annular outer ridge and an axial open ended slot, a dispensing cap for the neck comprising a hollow frusto-conical inner cap member and a hollow conical outer cap member both made of a pliable material, said members having companion outer and inner conical surfaces for close nesting relation, said inner cap member having on its bottom end a cylindrical extension of less diameter than its base to thereby provide an annular shoulder, said extension having an inner ridge for engaging below the ridge of the neck to lock the inner cap member thereto and a longitudinal ridge for reception in the slot of the neck to thereby prevent relative rotation between the neck and inner cap member, said outer cap member having an inner ridge capable of being pushed past the lower end of the base on the inner member to a position below the shoulder thereby connecting the two cap members together but permitting relative rotation, said inner cap member having on its top a semi-annular ridge and the inner part of the outer member having a lug for cooperating with the ends of the last named ridge to limit relative rotation between the cap members, said cap members having openings in their walls capable of being aligned when the lug engages one end of the top ridge on the inner member and fully out of any alignment when the outer cap member is rotated toward the other end of the top ridge.

11. In a dispensing structure, a chambered body for containing a substance to be dispensed and being provided with an upstanding cylindrical neck portion having an annular outer ridge and an axial open ended slot, a dispensing cap for the neck comprising a hollow frusto-conical inner cap member and a hollow conical outer cap member both made of a pliable material, said members having companion outer and inner conical surfaces for close nesting relation, said inner cap member having on its bottom end a cylindrical extension of less diameter than its base to thereby provide an annular shoulder, said extension having an inner ridge for engaging below the ridge of the neck and a longitudinal ridge for reception in the slot of the neck to thereby prevent relative rotation between the neck and inner cap member, said outer cap member having an inner ridge capable of being pressed by the lower end of the base on the inner member to a position below the shoulder thereby connecting the two cap members together but permitting relative rotation, said inner cap member having on it a part for cooperating with a part on the outer cap member to limit relative rotation between the cap members, said cap members having openings in their walls capable of being aligned when the said cooperating parts engage and fully out of any alignment when the outer cap member is rotated in a direction to separate the said parts.

12. In a dispensing structure, a chambered body for containing a substance to be dispensed and being provided with an upstanding cylindrical neck portion having an annular outer ridge and an axial open ended slot, a dispensing cap for the neck comprising a hollow frusto-conical inner cap member and a hollow conical outer cap member both made of a pliable material, said members having companion outer and inner conical surfaces for close nesting relation, said inner cap member having on its bottom end a cylindrical extension of less diameter than its base to thereby provide an annular shoulder, said extension having an inner ridge for engaging below the ridge of the neck and a longitudinal ridge for reception in the slot of the neck to thereby prevent relative rotation between the neck and inner cap member, said outer cap member having an inner ridge capable of being pushed past the lower end of the base on the inner member to a position below the shoulder thereby connecting the two cap members together but permitting relative rotation, said cap members having openings in their walls capable of being aligned or fully out of any alignment by relative rotation between the cap members.

13. In a dispensing structure, a chambered body for containing a substance to be dispensed and being provided with an upstanding cylindrical neck portion, a dispensing cap for the neck comprising a hollow frusto-conical inner cap member and a hollow conical outer cap member both made of a pliable material, said members having companion outer and inner conical surfaces for close nesting relation, said inner cap member having on its bottom end a cylindrical extension of less diameter than its base to thereby provide an annular shoulder, said outer cap member having an inner ridge capable of being past the lower end of the base on the inner member to a position below the shoulder thereby connecting the two cap members together but permitting relative rotation, and means for connecting the inner cap member to the neck in non-rotative relation, said cap members having openings in their walls capable of being aligned when the lug engages one end of the top ridge on the inner member and fully out of any alignment when the outer cap member is rotated toward the other end of the top ridge.

14. In a dispensing structure, a chambered body for containing a substance to be dispensed and being provided with an upstanding cylindrical neck portion having an annular outer ridge and an axial open ended slot, a dispensing cap for the neck comprising a hollow frusto-conical inner cap member and a hollow conical outer cap member both made of a pliable material, said members having companion outer and inner conical surfaces for close nesting relation, said inner cap member having on its bottom end a cylindrical extension of less diameter than its base to thereby provide an annular shoulder, said extension having an inner ridge for engaging below the ridge of the neck to lock the extension on the neck and a longitudinal ridge for reception in the slot of the neck to thereby prevent relative rotation between the neck and inner cap member, said outer cap member having an inner ridge capable of being pushed past the lower end of the base on the inner member to a position below the shoulder thereby connecting the two cap members together but allowing for relative rotation, said inner cap member having on its top a semiannular ridge and the inner part of the outer member having a lug for cooperating with the ends of the last named ridge to limit relative rotation between the cap members, said cap members having openings in their walls capable of being aligned when the lug engages one end of the top ridge on the inner member and fully out of any alignment when the outer cap member is rotated toward the other end of the top ridge, the wall of the inner cap being tapered on its inner surface toward the edges of its hole to thereby provide a feather edge of considerable flexibility so that pressure on the inside of the inner cap will readily press said feather edge against the wall of the outer cap member when there is no alignment of the holes.

References Cited in the file of this patent

UNITED STATES PATENTS

| | | |
|---|---|---|
| 1,593,025 | MacDonald | July 20, 1926 |
| 1,830,990 | Feih | Nov. 10, 1931 |
| 1,892,788 | Schwartz | Jan. 3, 1933 |
| 1,910,378 | Burke | May 23, 1933 |
| 1,951,544 | Burrell | Mar. 20, 1934 |
| 2,056,005 | Fleisch | Sept. 29, 1936 |

FOREIGN PATENTS

| | | |
|---|---|---|
| 537,506 | Germany | Nov. 5, 1931 |